United States Patent [19]

Walchek

[11] 4,023,771

[45] May 17, 1977

[54] MEANS FOR ENGAGING, LIFTING AND TRANSPORTING CONCRETE PIPE MOLDS

[75] Inventor: Ronald J. Walchek, South Sioux City, Nebr.

[73] Assignee: Concrete Pipe Machinery Company, Sioux City, Iowa

[22] Filed: Dec. 4, 1975

[21] Appl. No.: 637,515

Related U.S. Application Data

[62] Division of Ser. No. 453,574, March 22, 1974, Pat. No. 3,938,685.

[52] U.S. Cl. ................................ 249/139; 425/442

[51] Int. Cl.² ..................... E04G 13/02; B29C 1/16

[58] Field of Search .......... 214/620, 621, 730, 731, 214/750; 249/139, 161; 425/62, 442

[56] References Cited

UNITED STATES PATENTS

| | | | |
|---|---|---|---|
| 2,670,095 | 2/1954 | Blatz | 214/653 |
| 2,685,976 | 8/1954 | Ulinski | 214/653 |
| 2,693,289 | 11/1954 | Ulinski | 214/653 |
| 2,756,888 | 7/1956 | Avery | 214/653 |
| 2,775,359 | 12/1956 | Carpenter | 214/653 |
| 2,886,197 | 5/1959 | Harris | 214/653 |
| 3,635,613 | 1/1972 | Marsh et al. | 249/160 |
| 3,768,954 | 10/1973 | Marsh et al. | 425/451 |
| 3,785,607 | 1/1974 | Worker et al. | 214/653 |

*Primary Examiner*—L. J. Paperner
*Assistant Examiner*—Lawrence J. Oresky
*Attorney, Agent, or Firm*—Thomas M. Scofield

[57] ABSTRACT

Improvements in three-piece concrete pipe molds and means and devices for handling and transporting such molds both when filled and empty; improvements in mold handling apparatus, or devices attachable both to the lift mechanism of a vehicle and a three-piece pipe mold and useable for such purposes; a versatile adaptor which will handle and transport, in its various configurations, concrete pipe molds of the most varied sizes and configurations when mounted on the lift mechanism of a vehicle.

5 Claims, 18 Drawing Figures

Fig. 14.
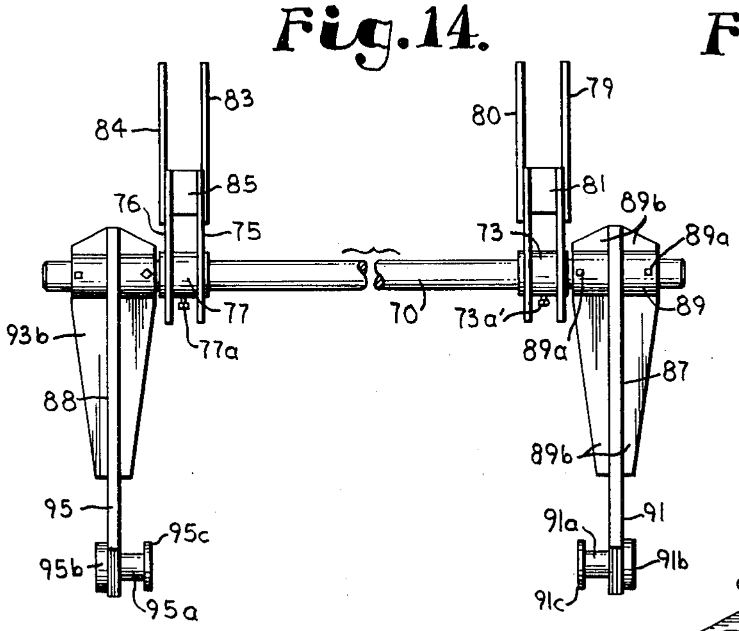
Fig. 14a.
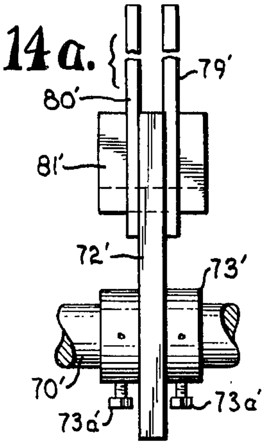
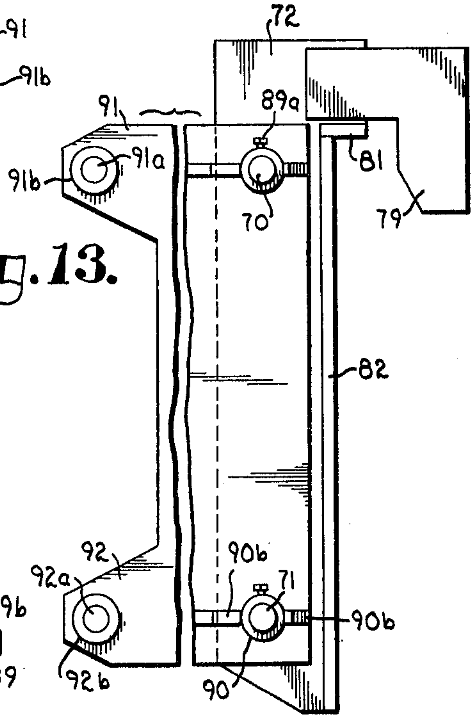
Fig. 13.
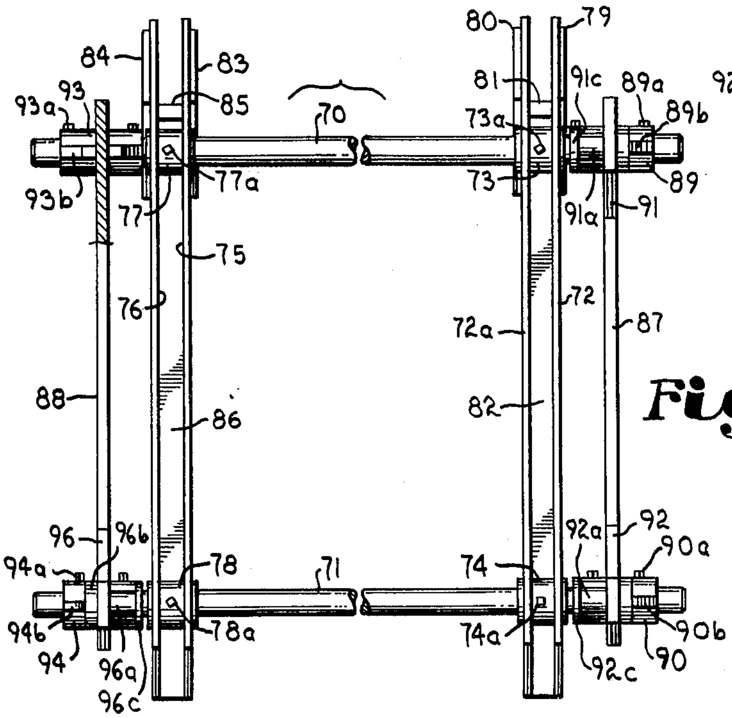
Fig. 15.

MEANS FOR ENGAGING, LIFTING AND TRANSPORTING CONCRETE PIPE MOLDS

This is a division of application Ser. No. 453,574, filed Mar. 22, 1974 now U.S. Pat. No. 3,938,685, issued Feb. 17, 1976.

BACKGROUND OF THE INVENTION

The packerhead or rollerhead process or method of concrete pipe formation is widely accepted as the least expensive and most efficient method of concrete pipe formation. Generally speaking, the apparatus for forming pipe by this method includes:

1. An outer, vertically disposed, longitudinally hinged, bell-end down mold or jacket, for shaping or forming the outer surface of a section of pipe. The mold or jacket alternatively may be bell-end up.

2. An interior, vertically reciprocal rotary packerhead, same concentrically disposed with respect to the mold and adapted to form the interior surface of the section of pipe. The completed pipe section consists of a bell or female end, first formed, the cylindrical body of the pipe, second formed thereabove, and a male end, last formed at the upper, terminal end of the pipe body. The sequence of steps varies on the end formed first. That described here and below is bell-end down.

The sequential steps of concrete pipe section formation by this process are as follows. The jacket is vertically situated, bell or female end down. The rotary packerhead is lowered concentrically therewithin, to the bottom of the mold. Concrete is then introduced and the packerhead shaft rotated so as to form the bell end of the pipe. The mold may be vibrated at this time to eliminate any bell end voids. Once the bell end is formed, the packerhead is raised and rotated while concrete is continuously introduced into the mold whereby to form the cylindrical body of the pipe above the bell. When the formation of the entire vertical height of the pipe section is completed, an additional one or more passes of the packerhead centrally of the mold and the formed pipe may be employed to finish the interior surface of the pipe. Thereafter, the packerhead is removed and the mold containing the completed pipe is moved for curing, whereupon a new mold (empty) is provided on site and the process repeated.

Although the pipe is of sufficient strength that it will support its own weight after formation, it must be cured to obtain full strength. That mold which contains a newly formed pipe is transferred from the pipe forming zone to the curing area where the mold is removed from the pipe for recycling for use in forming another pipe.

OBJECTS OF THE INVENTION

An object of the instant invention is to provide novel means for handling concrete pipe molds of the type employed in the manufacture of concrete pipe by the packerhead or rollerhead process.

Another object of the invention is to provide handling apparatus and means cooperating between a concrete pipe mold and a vehicle which are adapted to handle and transport concrete pipe molds, of any size or length, of the type used in the manufacture of concrete pipe by the packerhead or rollerhead process, including such molds with the concrete pipe formed therewithin.

Another object of the invention is to provide suitable engaging means mountable on various configuration, sizes and lengths of longitudinally hinged concrete pipe molds which will cooperate with suitable engaging means mounted on a handling vehicle, whereby the empty or filled mold may be readily lifted and transported.

Another object of the invention is to provide a novel vertical, longitudinally hinged, three-part concrete pipe mold for use in the manufacture of concrete pipe by the packerhead or rollerhead process, wherein engagable lift means are provided integral with the mold shell and the parts thereof for ready coupling by handling vehicles, whereby the empty or full concrete pipe mold may be handily lifted, manipulated and transported.

Another object of the invention is to provide cooperating lift and handling means for concrete pipe molds of the vertical, longitudinally hinged type and conventional lift trucks wherein no major modification is required to the lift trucks and the means which are carried by said lift trucks can readily be removed therefrom and the trucks used for other work.

Another object of the invention is to provide a novel intermediate frame construction for use in handling and transport of empty or loaded vertical, longitudinally hinged concrete pipe molds, which frame cooperates between a simple structure on a forklift truck and hook or hanger means secured to the mold in such manner that:

a. loss of cast pipe is less;

b. the frame or adapter can readily be field mounted on the forklift truck;

c. no modification is required to the forklift truck;

d. the frame or adapter carries a range of sizes with a minimum of adjustment; and e. same is adjustable to any forklift truck carriage.

Another object of the invention is to provide a single adaptor which may be readily adjusted and arranged to handle 12 inch through 36 inch diameter pipes, including 4 foot length pipe and 6 foot through 8 foot length pipe.

Still another object of the invention is to provide a combination adaptor unit made to carry 4 foot through 8 foot pipe, there being provided extra intermediate pick-up arms used when 4 foot length pipe is employed, same pivoted out of position for carrrying 6 foot through 8 foot length pipe.

Still another object of the invention is to provide a concrete pipe mold adaptor which operates to handle 39 inches through 60 inches diameters in 8 foot lengths of concrete pipe.

Other and further objects of the invention will appear in the course of the following description thereof.

In the drawings, which form a part of the instant specification, and are to be read in conjunction therewith, embodiments of the invention are shown and, the various views, like numerals are employed to indicate like parts.

FIG. 1 is a side view of an assembly of closed mold, adaptor and lift truck carrying the adaptor engaged, immediately prior to lifting the mold from the floor. FIG. 1 shows the adaptor for 6 foot through 8 foot length pipe to handle 12 inch to 36 inch diameter pipe.

Figure 5:
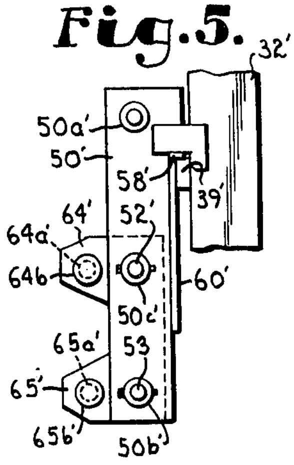
Figure 3:
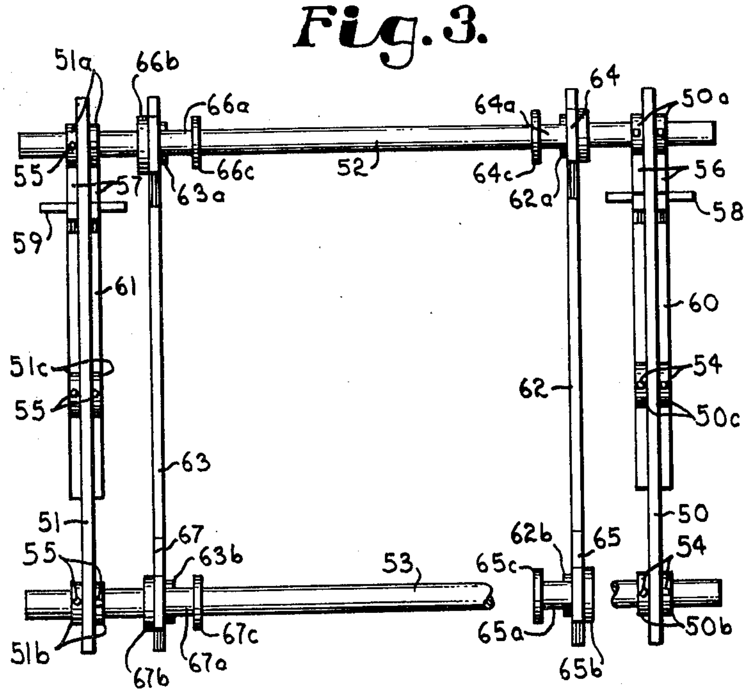
FIG. 3 is a front view of the adaptor of FIGS. 1 and 2.

FIG. 5 is a fragmentary side view showing the adaptor for 4 foot length pipe to handle 12 inch through 36 inch diameter pipe.

Figure 6:
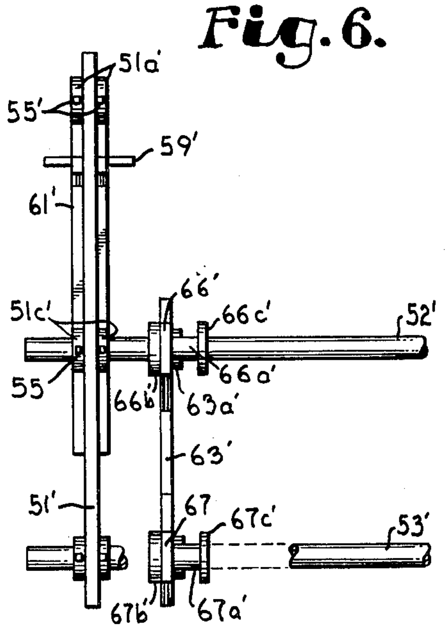

FIG. 6 is a fragmentary front view of one side of the adaptor of FIG. 5.

Figure 1:
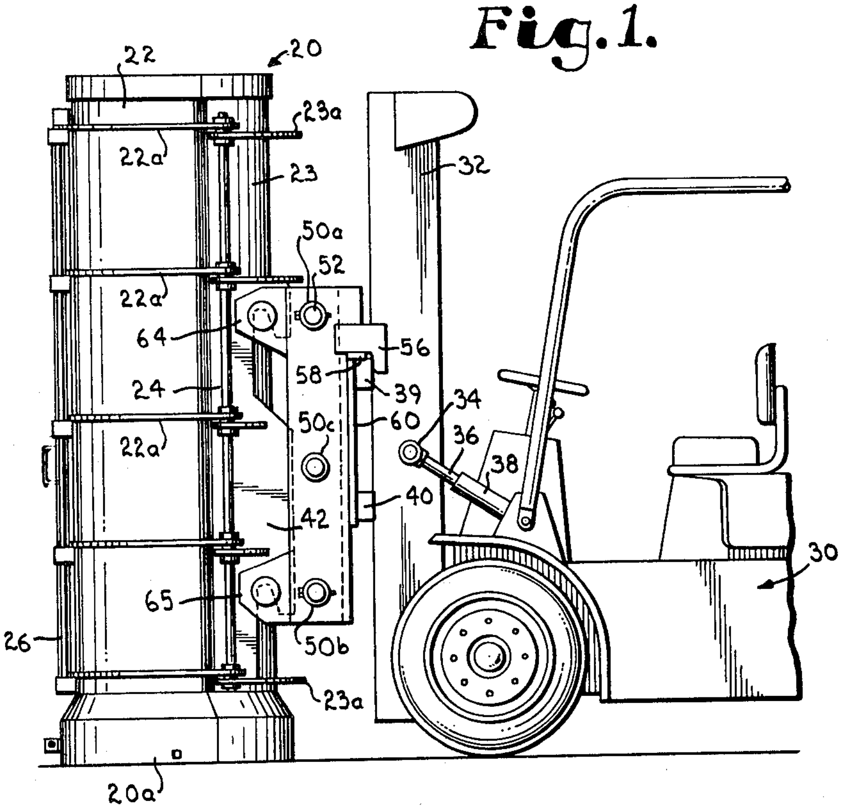
Figure 7:
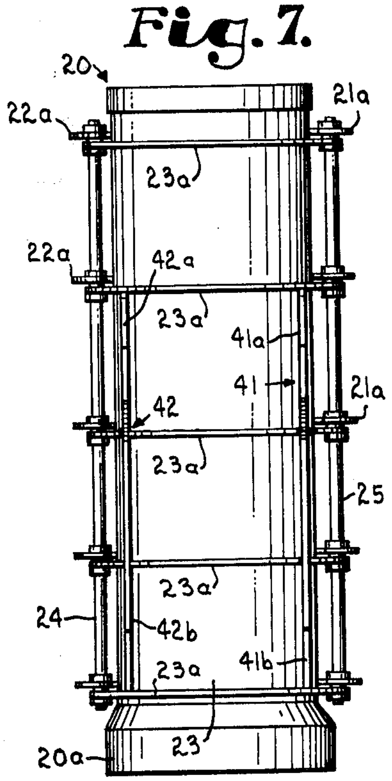
Figure 2:
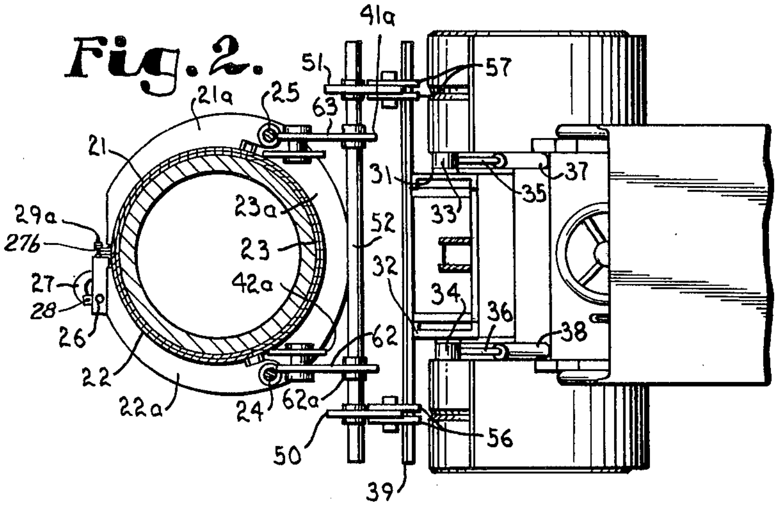
FIG. 2 is a plan view of the apparatus assembly of FIG. 1.

FIG. 7 is a view of the mold of FIGS. 1 and 2 looking from right to left in the views.

Figure 8:
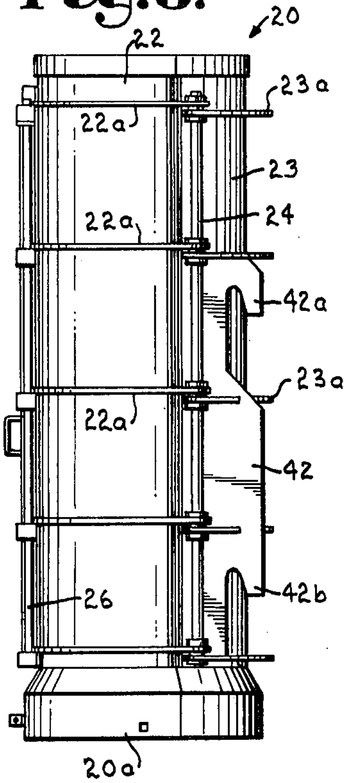
Figure 4:
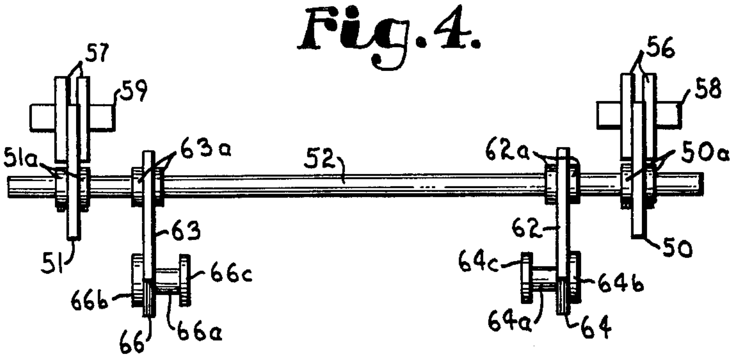
FIG. 4 is a top view of the adaptor of FIGS. 1–3, inclusive.

FIG. 8 is a side view of the mold in the left-hand portions of FIGS. 1 and 2 without the adaptor engaged therewith.

Figure 8A:
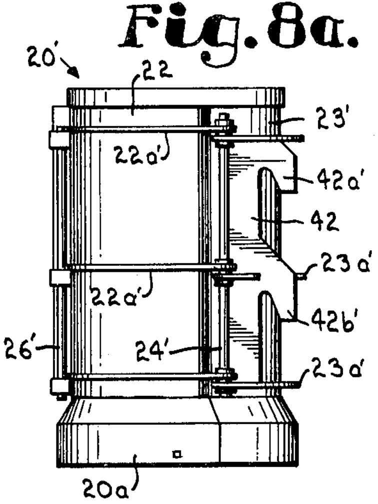

FIG. 8*a* is a side view of the mold with which the adaptor of FIGS. 5 and 6 work.

Figure 9:
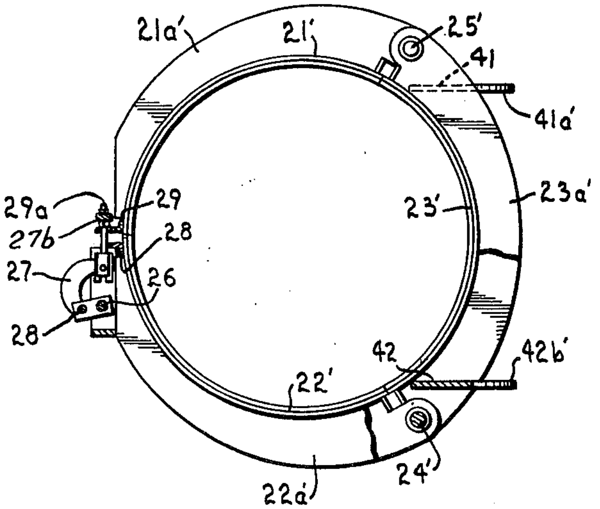

FIG. 9 is a plan view with a portion thereof cut away of the mold of FIG. 8*a*.

Figure 10:
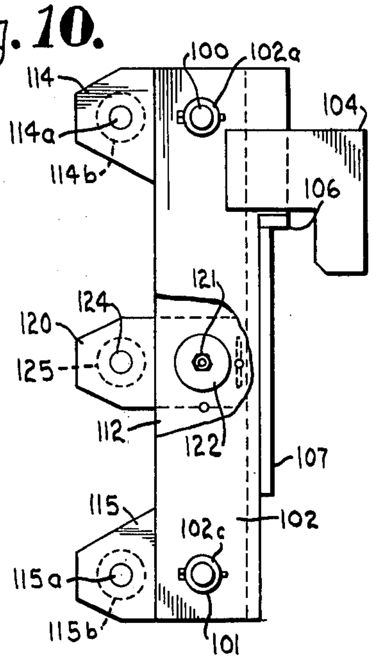

FIG. 10 is a side view of another adaptor which is a versatile unit able to carry 4 foot through 8 foot length pipe (12 inches through 36 inches diameter) wherein the center pick-up arms will pivot out of position when carrying 6 foot or 8 foot length pipe..

Figure 11A:
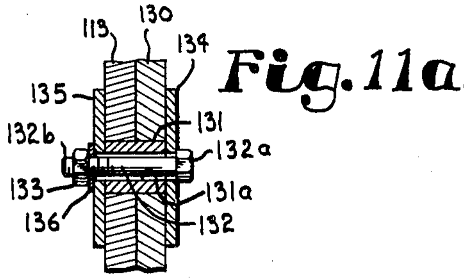
Figure 11:
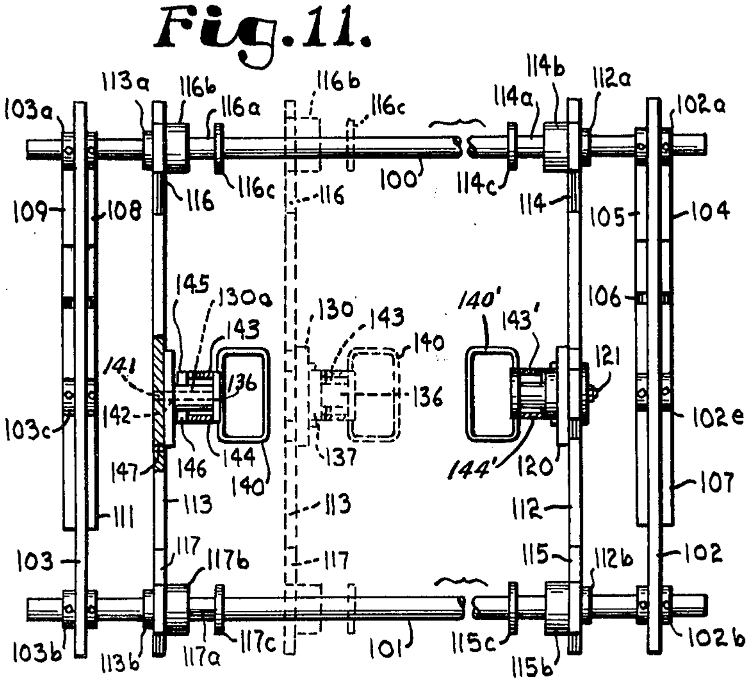

FIG. 11 is a front view of the versatile adaptor of FIG. 10 looking from left to right in the view of FIG. 10 with portions cut away and additive dotted line showing for clarity in the view.

FIG. 11*a* is a detailed view of the handle mounting of FIG. 11.

Figure 12:
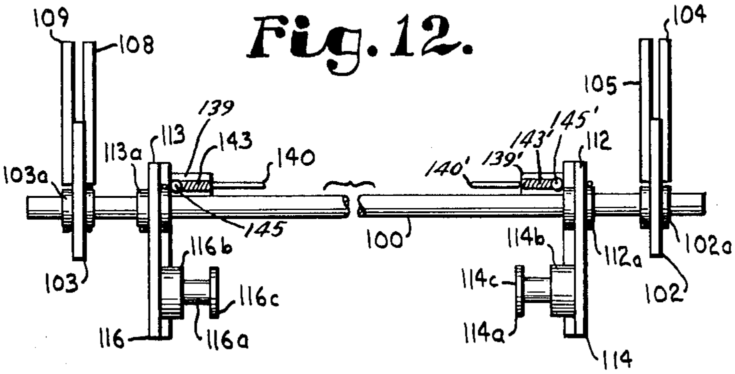

FIG. 12 is a plan view of the versatile adaptor of FIGS. 10 and 11.

FIG. 13 is a side view of an adaptor which will handle 39 inch through 60 inch diameter concrete pipe in 8 foot pipe length.

FIG. 14 is a plan view of the adaptor of FIG. 13.

FIG. 14*a* is a fragmentary plan of a variation of the device of FIGS. 13–15, inclusive wherein single (not double) plates are employed to carry the hooks which removably mount the adaptor on the lift truck frame.

FIG. 15 is a front view of the adpator of FIGS. 13 and 14.

FIGS. 1–4, INCLUSIVE (AND FIGS. 7 AND 8)

Referring to the drawings and, particularly, FIGS. 1–4, incl. and 7 and 8, therein is shown a first assembly of closed mold for concrete pipe, adaptor and lift truck carrying the adaptor, the entire arrangement in operating position immediately prior to lifting the mold from the floor. The adaptor seen in these particular figures is usuable with molds for casting 6 foot through 8 foot length pipe which are 12 inches to 36 inches in diameter.

The mold itself is seen in FIGS. 1, 2, 7 and 8 and will be first described. Referring, then, to these figures, the concrete pipe mold is generally designated 20, basically comprising a vertically disposed, longitudinally hinged, bell-end down mold or jacket operative to shape or form the outer surface of a section of pipe. The use of such mold in casting concrete pipe in conventional fashion has been previously briefly described and will not be redescribed here. The bell-up option may be employed but is not here shown.

The mold employed is necessarily a three-piece mold having a first mold section 21, a second mold section 22 and a third or base mold section 23. Base mold section 23 has a plurality of arcuate flanges 23*a* welded or otherwise fixedly attached to the outside surface thereof, while mold sections 21 and 22 have like arcuate flanges 21*a* and 22*a* likewise fixed to one another, respectively, optionally spaced upwardly above flanges 23*a* on section 23. Suitable collars are provided around openings through each of these sets of flanges, thereby to receive therethrough hinge rods 24 and 25. Thus, mold sections 21 and 22, hinged to section 23 by rods 24 and 25, may pivot around the hinge rods to open the mold for access to the cast concrete pipe or removal of the mold therefrom. The arcuate extent of sections 21 and 22 exceeds 180°, as may be seen in FIG. 2. For different size three-piece molds the arcuate extent of sections 21 and 22 exceeds 180° but to differing extents.

Closure means are provided to lock mold sections 21 and 22 in closed position (as seen in FIGS. 1, 2 and 8) for receipt of concrete, reenforcements, etc. in the molding process. Typically, such conventional locking means includes a rod 26 carried by flanges 22*a*. Handle 27 is on rod 26. Arcuate member 27 is pivoted on shaft 28 and carries bolt 27*a* on the other end thereof. The latter removably engages angle 29 on section 21 via adjustable locking members 27*b* to maintain mold closure.

All of the previously described structure of a three-part mold is essentially conventional.

A lift truck of any desired conventional structure (generally designated 30) is used to pick up, transport and handle the empty concrete mold after removal of cast pipe therefrom, as well as the mold containing the cast pipe after the molding operation. While many configurations of truck and lift attachments may be employed, that shown involves a pair of vertical C-section members 31 and 32 having attachments 33 and 34 for connection of the shafts or arms 35 and 36 of hydraulic pistons 37 and 38. A pair of transverse beams 39 (upper) and 40 (lower) are removalby or fixedly attached to the forward legs of members 31 and 32 for removable attachment and positioning of an adaptor thereto (to be described). It should be understood that any desired combination of hydraulic pistons or members thereof may be employed, mounted as desired on the lift truck 30. Likewise, other types and shapes of structurals from members 31 and 32 may be employed, the basic necessity to be provided comprising the horizontal elongate beam members 39 and 40. Any lift truck and support grid or beam structure, as well as power handling means (such as hydraulic pistons) may be employed with this adaptor and lift mechanism.

Returning to the mold 20, a pair of elongate plates generally designated 41 and 42 are welded or otherwise fixedly attached to the outer surface of base mold section 23 and/or the flange members 23*a* to provide fixed and rigid support and positioning therefor relative to said mold section 23. Members 41 and 42 have paired hooks 41*a* and 41*b* and 42*a* and 42*b*, respectively, formed thereon for purposes to be described. These pairs of hooks (41*a* and 42*a* and 42*b* and 41*b*) are vertically aligned with one another and, as may be seen from the positioning of members 41 and 42, laterally spaced from one another, symmetrically, on mold section 23.

The mold of FIGS. 1, 2, 7 and 8 which operates to define the outer configuration of the cast concrete pipe comprises, thus, at least three mold sections normally disposed in upstanding positions. Each of such sections defines a longitudinal segment of the outer configuration of the pipe and is complementary and juxtaposable at longitudinal junctures. Latching means are formed along one of the longitudinal junctures between a first two of the three sections for disengageably latching the first two section together. Hinge means are formed along the other two of said longitudinal junctures between the first two sections and the third. The hinged mold sections are adapted to stand upright without lateral support. Coupling means are connected to the third mold section for disengageable securement thereto of means for handling the mold. The coupling means preferably comprise a pair of double hook carrying members each secured to the third section, the members laterally spaced from one another on the third section and the hooks spaced vertically from one another on each member.

Turning to the adaptor which is normally carried by the lift truck on beams 39 and 40 and operates to engage and disengage the hooks on the members 41 and 42 attached to the mold section 23, same is seen in FIGS. 1, 2, 3 and 4.

A basic structural frame is made up of a first pair of normally vertical, rigid plates 50 and 51 which are rigidly connected to one another and spaced apart by a pair of elongate, normally horizontal rigid shafts 52 and 53. Shafts 52 and 53 pass through the holes in plates 50 and 51 which are surrounded by collars (the upper and lowermost holes through the plates) 50*a* and 50*b* and 51*a* and 51*b*, respectively. Set screws or bolts 54 and 55 either passing through openings through shafts 52 and 53 or engaging thereagainst, are provided in each of the collars 50*a*, *b* and 51*a*, *b* for plates 50 and 51, respectively. Additional openings surrounded by collars 50*c* and 51*c* are provided intermediate the height of each of the plates 50 and 51 for a purpose which will be described with respect to the adaptor of FIGS. 5 and 6. These collars have like set screws or bolts 54 and 55, respectively.

Plates 50 and 51 may be adjusted laterally on shafts 52 and 53 with respect to one another to get the desired horizontal spacing.

In the mold adaptor constructions of FIGS. 1–12, inclusive, the plates carrying the mold hook engaging members are positioned inboard of the plates carrying the lift cart frame engaging hooks. The reverse is true of FIGS. 13–15, inclusive. The relationships shown are preferred by may be reversed.

Means are provided on said first set or pair of plates 50 and 51 for attaching the basic frame to beams 39 and 40 on Means are provided on said first set or pair of plates 50 and 51 for attaching the basic frame to beams 39 and 40 on the lifting mechanism of vehicle 30. This comprises paired hook members 56 (on plate 50) and 57 (on plate 51). Additionally, there are preferably provided flat plate members 58 and 59 (immediately under hooks 56 and 57, respectively) which operate to overlie the upper face of beam 39, the backside of which the depending portion of hooks 56 and 57 engage. Still further, there is provided elongate vertical plates 60 and 61 on the backside (toward the lift truck) of each of plates 50 and 51, respectively. These plates 60 and 61 lie against and abut the outboard or front faces of beams 39 and 40 as seen in FIG. 1 whereby to provide a firm, unmoving engagement of the adaptor frame therewith, when the hooks 56 and 57 are engaged with beam 39 as seen in FIG. 1.

A second pair of normally vertical, rigid plates 62 and 63 are removably mounted on shafts 52 and 53 by means of openings therethrough surrounded by collars 62*a* and *b* and 63*a* and *b*, respectively. These collars also have set screws or locking bolts provided therewith (not seen) to firmly yet adjustably fix the lateral positions of plates 62 and 63 with respect to one another on shafts 52 and 53.

Each of the plates 62 and 63 is C-shaped in side view with plate 62 having forward extensions 64 and 65 thereon, while plate 63 has forward (away from the lift truck and toward the mold) extensions 66 and 67 thereon.

A plurality of inwardly extending stub shafts 64*a*, 65*a*, 66*a* and 67*a* are fixedly mounted on C-extensions 64–67, incl., extending through openings therein, there also being provided retainer collars 64*b*–67*b*, incl. thereon, as well as limit flanges 66*c*–67*c*, respectively. The latter operate to retain the mold hooks 41*a*, *b* and 42*a*, *b* on the stub shafts 64*a*–67*a*, respectively, as particularly seen in FIG. 2. Said otherwise, the plates or beams 62 and 63 are so spaced from one another on shafts 52 and 53, and the stub shafts 64*a*–67*a*, respectively, are of such length that, when the said stub shafts are engaged with mold hooks 41*a* and *b* and 42*a* and *b*, the retainer flanges 64*c*–67*c*, inclusive frictionally abut the members 41 and 42 or are closely positioned next thereto.

In opertion of the device of FIGS. 1–4, inclusive with respect to the molds of FIGS. 1, 2, 7 and 8, the following is noted. First, the hook carrying members 41 and 42 must be fixed to the third or basic, non-pivoting mold section 23 or parts thereof. Secondly, beams 39 and 40 or their equivalent must be fixed to the lift mechanism of a lift truck or like handling vehicle such as seen in the specific example of FIGS. 1 and 2. Thereafter, the adaptor frame, particularly comprising plates 50 and 51 on shafts 52 and 53, with plates 62 and 63 also mounted thereon, is engaged with beams 39 and 40 as seen in FIG. 1. This specifically means that hooks 56 and 57 engage beam 39 with plates 58 and 59 overlying the upper face thereof. Likewise, plates 60 and 61 lie against the outboard or front faces of beams 39 and 40.

As is conventional, C-members 31 and 32 may be raised and lowered and moved inwardly and outwardly with respect to the front of the lift vehicle 30 by the extension and retraction of the piston rods 35 and 36 of hydraulic pistons 37 and 38 (and any other piston connections employed in conventional manner). With the adaptor in place as seen in FIG. 1, the stub shafts 64*a*–67*a* may be engaged or disengaged with or from, respectively, the hooks 41*a* and *b* and 42*a* and *b* by forward and backward and upward and downward motion of the members 31 and 32, such results in like movement of stub shafts 64*a*–67*a*, incl. because same are rigidly fixed in position relative to the beams 39 and 40. Thus, the lift truck carrying the adaptor may come up to an empty mold and engage stub shafts 64*a*, etc. with hooks 41*a*, *b* and 42*a*, *b* to carry the mold back to the molding room. Likewise, the adaptor may be engaged with a mold containing a cast concrete pipe to carry same to the curing room.

FIGS. 5, 6, 8*a* and 9

These figures show a mold adapted to making 4 foot long concrete pipe lengths of diameters 12 inches through 36 inches and the adaptor usable therewith. The only differences between the mold of these figures and the mold of the previous figures and, as well, the adaptor of these figures as compared with the adaptor of the previous figures, are as follows:

1. The height of the mold if considerably less than the previous mold whereby the hook carrying plates (analogous to 41 and 42) are considerably shorter; and 2. The length of the second pair of plates carrying the stub shafts to engage the mold hooks (analogous to plates 62 and 63) is considerably less, whereby the normally horizontal shafts (analogous to 52 and 53) are fitted through and engaged into the center (or intermediate) and lower openings encircled by collars 50*c* and 51*c* and 50*b* and 51*b*.

Since these are the only differences between the molds and the adaptors of FIGS. 5, 6, 8*a* and 9 as compared with FIGS. 1–4, inclusive and 7 and 8, all of the parts which are the same or closely analogous to those parts seen in the earilier figures are numbered the same in FIGS. 5, 6, 8*a* and 9, but primed. The operation and function thereof is the same and will not be here described again.

The mold handling apparatus or adaptor seen in FIGS. 1–9, inclusive thus has thereon means for removable engagement with a concrete pipe mold having at least three longtudinally hinged sections and further means for attachment to a vehicle having a lifting mechanism. This handling apparatus thus comprises a basic frame made up of a first pair of normally verticle rigid plates connected to one another and spaced apart by a pair of elongate, normally horizontal, rigid shafts. A second pair of normally vertical rigid plates are mounted on the shafts and spaced laterally from one another. Means are provided on the first pair of plates for attaching the frame to the lifting mechanism of a vehicle. Means are provided on the second pair of plates for removable engagement with the concrete pipe mold.

Preferably, each of the first pair of plates has three vertically separated openings therethrough, each adapted to receive therewithin and therethrough one of said shafts, whereby the shafts may be positioned either in the upper and lowermost pairs of openings or the two lower pairs or sets of pairs of openings. In the case of molds of greater height, the second pair of plates is substantially the same height as the first pair. For use with molds of lesser height, the second pair of plates is shorter than the first pair and the shafts are positioned in the lower sets of pairs of holes of the first pair of plates.

The means on the first pair of plates for attaching the frame to the lifting mechanism of a vehicle comprises at least one hook connected to each said plate in the upper portion thereof. Preferably, this attaching means from the first pair of plates comprises a pair of hooks on the upper portion of each of said pair of first plates.

Each one of the second pair of plates is preferably C-shaped in side view and the means thereon for removable engagement with a concrete pipe mold are mounted on each leg of the C. The means mounted on each leg of the C for said removable engagement are preferably mounted inboard of each of the second pair of plates and opposed to one another.

The adaptors of FIGS. 1–9, inclusive show arrangements wherein the second pair of plates is positioned inboard of said first pair of plates. In the modification to be described, the second pair of plates is positioned outboard of the first pair of plates.

FIGS. 13–15, INCLUSIVE

The adaptor of FIGS. 13–15, inclusive is so configured and constructed as to be able to transport and handle concrete pipe molds (filled or empty) in diameters of 39 inches through 60 inches. This adaptor is characterized by massive (or multiple) first and second plate pair construction and also illustrates the usage of the second pair of plates (carrying the stub shafts for engaging the mold hooks) positioned outboard of the first pair of plates (which carry the hooks and plate members which permit engagement of the adaptor frame with the normally horizontal beams on the lift truck's lift apparatus). There is no showing of the mold or hooks therein or, for that matter, the lift truck and lift apparatus with respect to the adaptor configuration of FIGS. 13–15, inclusive. This is because such are essentially the same as seen and described in previous figures.

Turning, then, to FIGS. 13–15, inclusive, there is provided a pair of elongate, normally horizontal, rigid shafts 70 and 71 which are adapted to carry first and second pairs of plates removably mixed thereon. In the instant case, the "first pair" of plates may become a first pair of pairs of plates. That is, plates 72 and 72*a* are rigidly fixed to or made integral with collars 73 and 74, said collars having openings therethrough to receive shafts 70 and 71, respectively. Collars 73 and 74 have set screws or bolts 73*a* and 74*a* which either set against or pass through openings in shafts 70 and 71 to rigidly fix the lateral position of plates 72 and 72*a* with respect to shafts 70 and 71. Likewise, plates 75 and 76 are rigidly fixed to or integral with collars 77 and 78 which receive therethrough shafts 70 and 71. Collars 77 and 78 further have set screws or lock bolts 77*a* and 78*a*, respectively, to fix plates 75 and 76 on said shafts.

Plates 72 and 72*a* each have fixed to the outer face thereof a hook, hook 79 being welded or otherwise fixedly attached to the upper portion of plate 72 and hook 80 being welded or otherwise fixedly attached to plate 72*a*. The upper portion of plates 72 and 72*a* extend to the right in FIG. 13 (toward the lift truck) whereby to conventionally carry the hooks thereon and, as well, receive thereunder plate 81 under is welded or otherwise fixedly attached to each of the plate 72 and 72*a* portions referred to. Elongate vertical flange 82 abuts at its upper end the lower face of plate 81 and extends, preferably, the length of plates 72 and 72*a*. The lower face of plate 81 and the right hand face of plate 82 (in FIG. 13) serve to abut and engage the beams on the lift truck as previously shown and described with respect to beams 39 and 40 in FIG. 1, while hooks 79 and 80 overlie the upper one of the such beams. Welding of hooks 79, 80 and 83, 84 to plates 72, 72*a* and 75 and 76 typically is a field weld performed by the user.

Turning to like plates 75 and 76 on collars 77 and 78, hooks 83 and 84 are fixed to the upper portions of plates 75 and 76 in manner analogous to hooks 79 and 80 on plates 72 and 72*a*. Likewise, normally horizontal plate 85 and normally vertical flange 86 are fixed to phase 75 and 76 in the same manner as plates 81 and 82 to plates 72 and 72*a* and serve like functions.

Turning to the second pair of plates which carry the means for engaging the lift hooks on the concrete molds (analogous to plates 62 and 63 of previous figures), there are provided a pair of normally vertical plates 87 and 88. Plate 87 is rigidly fixed to or integral with collars 89 and 90 which receive therethrough shafts 70 and 71. Set screws or lock bolts 89*a* and 90*a* on collars 89 and 90, respectively, serve to rigidly fix the lateral position of plate 87 with respect to shafts 70 and 71.

Symmetrical reinforcing ribs 89*b* and 90*b*, respectively, rigidly the plate 87-collar 89 and 90 constructions and strengthen same.

Plate 87 has forward (away from the lift truck and toward the mold) extensions 91 and 92 which (FIG. 13) makes plate 87 C-shape in side view. Stub shafts 91*a* and 92*a* are rigidly fixed with respect to extensions 91 and 92 by collars 91*b* and 92*b*. Circular flanges 91*c* and 92*c* are rigidly fixed to the inboard ends of stub shafts 91*a* and 92*a* and serve the same purpose and function as flanges 64*c*–67*c* in previous figures.

Turning to the plate 88, same is mounted on the shafts 70 and 71 by collars 93 and 94, same being secured relative to said shafts by set screws or lock bolts 93*a* and 94*a*. Reinforcing ribs 93*b* and 94*b* brace collars 93 and 94 with respect to plate 88. Forward extensions 95 and 96 of plate 88 carry stub shafts 95*a* and 96*a* thereon rigidly connected to said extensions by collars 95*b* and 96*b*. Finally, stub shaft end plates 95*c* and 96*c* are provided.

As previously noted, the manner of attachment of the adaptor of FIGS. 13–15, inclusive to the lift truck horizontal beams is like that of the previously described adaptors of FIGS. 1–9, inclusive. Further, the engagement and disengagement of the stub shafts 91*a* and 92*a*, as well as 95*a* and 96*a*, with the paired, vertically spaced hooks on a concrete pipe mold is the same as has previously been described.

Alternatively, hooks 79, 80 and 83, 84 may be mounted on single plates which would replace the double plates 72, 72*a* and 75 and 76. FIG. 14*a* shows hooks 79′ and 80′ mounted on a single plate 72′ fixed on shafts 70′ and 71′ (not seen) by collars 73′ and 74′ (not seen) carrying bolts on set screws 73*a′* and 74*a′* (not seen).

FIGS. 10–12, INCLUSIVE

The adaptor of FIGS. 10–12, inclusive is a versatile unit able to carry 4 feet through 8 feet length pipe molds which are 12 inches through 36 inches in diameter. In this modification or adaptation, the single device will be able to carry out all of the functions of the two different adaptors of FIGS. 1–9, inclusive. Said otherwise, the adaptor of FIGS. 5 and 6 (relative to the molds of FIGS. 8*a* and 9) show the basis adaptor frame of the first four figures adjusted to handle 4 inches length pipe molds, while the adaptor of FIGS. 1–4, inclusive handle the mold of FIGS. 7 and 8 (6 feet through 8 feet length pipe of 12 inches to 36 inches diameters). Thus, the second pair of plates 62′ and 63′ of FIGS. 5 and 6 differ from plates 62 and 63 of the first four figures.

This versatility is achieved by providing, in essence, the basic structure of the adaptor of FIGS. 1–4, inclusive with additional structure comprising a pivotable extension on each of the second pair of plates carrying a stub shaft positioned thereon analogous to one of the stub shafts 64*a′* and 66*a′*.

The structure of FIGS. 10–12, inclusive which is substantially identical to the structure of the adaptor seen in FIGS. 1–4, inclusive will be first described and, thereafter, the novelty or difference in the adaptor variation of FIGS. 10–12, inclusive as compared thereto.

Referring, then, to FIGS. 10–12, inclusive, there is provided a pair of elongate, normally horizontal, rigid shafts 100 and 101. A first pair of normally vertical, rigid plates 102 and 103 are mounted thereon by collars 102*a–c*, inslusive and 103*a–c*, inclusive, respectively, fixed to plates 102 and 103. The presence of center collars 102*c* and 103*c* is not necessary, but provides versatility and interchangability with other second plate pairs as seen in FIGS. 1–6, inclusive, if desired. Suitable set screws or lock bolts of the type previously described (unnumbered) are provided to fix the collars and their respective plates in position on shafts 100 and 101.

Paired hooks 104 and 105 are rigidly fixed to the upper portion of plate 102. Normally horizontal transverse plate 106 is mounted under the shelf of the upper portion of plate 102 extending under the horizontal portions of hooks 104 and 105 being ridigly welded or fixed thereto. Normally vertical flange 107 extends downwardly from the undersurface of plate 106 and is rigidly welded or otherwise fixedly attached to the right hand face of plate 102 in FIG. 10 (toward the lift truck position).

Plate 103 is likewise equipped with paired hooks 108 and 109, horizontal plate 110 and vertical plate 111. Attachment of hooks 104, 105 and 108, 109 is typically a field operation by the user.

In FIGS. 10–12, inclusive there is provided a second pair of plates 112 and 113 having collars 112*a*, 113*a* and 112*b* and 113*b* rigidly affixed to the upper and lower portions thereof, respectively, to receive therethrough shafts 100 and 101. Suitable set screws or locking bolts to engage or extend through shaft 101 are provided (unnumbered) on these collars.

There are provided integral, forward (away from the lift truck position and toward the mold position) extensions 114 and 115 on plate 112 and 116 and 117 on plate 113. These integral extensions make each of plates 112 and 113 C-shaped in side view (FIG. 10). Stub shafts 114*a*–117*a*, inclusive are provided, rigidly fixed by collars 114*b*–117*b*, inclusive to extensions 114–117, respectively. Stub shaft end plates 114*c*–117*c*, inclusive are rigidly fixed to the ends of the stub shafts 114*a*–117*a*, inclusive.

All of the above structure is substantially the same as the structure of the adaptor of FIGS. 1–4, inclusive.

Turning to the unique elements of the device at FIGS. 10–12, inclusive, elongate plate 120 is pivotally mounted on bolt 121 extending through an opening in plate 112. Washers 122 and 123 abut against the outside face of plate 112 and the inboard face of plate 120, respectively, retained by the head of bolt 121 (part threaded) at one end and the nut 121*a* removably threaded on the opposite threaded end of bolt 121. A sleeve (not seen in FIGS. 10–12, inclusive, for plate 120, but see FIG. 11*a*) encircles shaft 121 between the washer discs 122 and 123. Stub shaft 124 is fixed by collar 125 to plate 120 and has retainer end plate 126 fixed to the end thereof.

Particularly referring to FIG. 11*a*, plate 130 is pivotally mounted on sleeve 131 which extends through openings in plates 113 and 130 and has an opening 131*a* extending therethrough adapted to receive bolt 132 which has enlarged head 132*a* at one end thereof and externally threaded end portion 132*b* adapted to receive nut 133 thereon. A pair of circular washers 134 and 135 face the outboard and inboard sides of plates 113 and 130, respectively, and have openings therethrough to pass the shaft of bolt 132 which fixes the assembly together. An additional washer 136 may be employed between nut 133 and plate 135. Stub shaft 136 is fixed by collar 137 to plate 130 and has retainer end disc 138 fixed to the end thereof.

The dotted line showing of FIG. 11 shows the view of that plate as would actually be seen. The full line showing to the left is cut away to show the position locking means.

On the other side of plate 130 from stub shaft 136 there is positioned cylindrical hollow block 139 fixed to the inboard face of plate 130. Handle 140 has elongate pin 141 extending through opening 130*a* in plate 130 and opening 142 in plate 116. Springs 143 and 144 are fixed at one end to handle 140 and at their others to spring retainers 145 and 146 fixed to block 139. Alternate opening 147 receives pin 141 when handle 140 is pulled from left to right in FIG. 11 and plate 30 is pivoted (so stub shaft 136 rises in that view) around sleeve 131.

Like parts to those described with respect to plate 30 are seen re plate 120, numbered the same but primed.

Pivoting stub shafts 124 and 136 out of line with the other stub shafts permits use of uppermost and lowermost mold hook engaging means for longer molds.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A device for forming and handling concrete pipe adapted for attachment to a vehicle having a lifting mechanism comprising, in combination:

a mold operating to define the outer configuration of a concrete pipe comprising:

at least three mold sections normally disposed in upstanding positions;

each of said sections defining a longitudinal segment of the outer configuration of the pipe and being complementary and juxtaposable at longitudinal junctures;

latching means formed along one of said longitudinal junctures between a first two of said three sections for disengageably latching said first two sections together;

hinge means formed along the other two of said longitudinal junctures between said first two sections and the third one of same;

said hinged mold sections adapted to stand upright without lateral support; and coupling means connected to said third mold section for disengageable securement thereto of means for handling said mold;

said coupling means comprising:

a pair of double hook carrying members each secured to said mold third section;

the members laterally spaced from one another on said mold third section, and the hooks spaced vertically from one another on each said member and opening downwardly;

a mold handling apparatus comprising:

a frame made up of a first pair of normally vertical rigid plates connected to one another and spaced apart by a pair of elongate normally horizontal rigid shafts;

a second pair of normally vertical rigid plates mounted on said shafts and spaced laterally from one another;

means on said first pair of plates for attaching said frame to the lifting mechanism of a vehicle, and means on said second pair of plates for removable engagement with said concrete pipe mold;

said latter means comprising a pair of vertically spaced, normally horizontal stub shafts fixedly attached to each of said second pair of plates;

the said pairs of shafts movable laterally towards and away from one another for adjustments to engage the hooks of the said hook carrying members of different size molds by translation of the said second pair of plates laterally towards and away from one another on said frame shaft.

2. A device as in claim 1 wherein the means on the first pair of plates for attaching said frame to the lifting mechanism of a vehicle comprise at least one hook connected to each plate in the upper portion thereof.

3. A mold handling apparatus as in claim 1 wherein the second pair of plates is positioned inboard of said first pair of plates.

4. A mold handling apparatus as in claim 1 wherein the second pair of plates is positioned outboard of the first pair of plates.

5. A device for forming and handling concrete pipe adapted for attachment to a vehicle having a lifting mechanism comprising, in combination:

a mold operating to define the outer configuration of a concrete pipe comprising:

at least three mold sections normally disposed in upstanding positions;

each of said sections defining a longitudinal segment of the outer configuration of the pipe and being complementary and juxtaposable at longitudinal junctures;

latching means formed along one of said longitudinal junctures between a first two of said three sections for disengageably latching said first two sections together;

hinge means formed along the other two of said longitudinal junctures between said first two sections and the third one of same;

said hinged mold sections adapted to stand upright without lateral support; and coupling means connected to said third mold section for disengageable securement thereto of means for handling said mold;

a mold handling apparatus, comprising:

a frame made up of a first pair of normally vertical rigid plates connected to one another and spaced apart by a pair of elongate, normally horizontal, rigid shafts;

a second pair of normally vertical rigid plates mounted on said shafts and spaced laterally from one another;

means on said first pair of plates for attaching said frame to the lifting mechanism of a vehicle;

means on said second pair of plates for removable engagement with said concrete pipe mold;

each one of the second pair of plates C-shaped in side view and the means on said second pair of plates for removable engagement with said concrete pipe mold mounted on each leg of the C, and a pair of members pivotally mounted on each of said second pair of plates intermediate the upper and lower ends of the latter, each of said members carrying means for removable engagement with said concrete pipe mold, and pivotable means for first fixing the position of said members parallel to the C-legs of said second pair of plates and at least one position at right angles thereto.

* * * * *